(12) United States Patent
Yasuda et al.

(10) Patent No.: US 11,137,758 B2
(45) Date of Patent: Oct. 5, 2021

(54) VEHICLE USE SYSTEM

(71) Applicant: HONDA MOTOR CO., LTD., Tokyo (JP)

(72) Inventors: Naoto Yasuda, Wako (JP); Takafumi Hirose, Wako (JP); Yuki Oshitani, Tokyo (JP); Susumu Iwamoto, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 362 days.

(21) Appl. No.: 16/285,335

(22) Filed: Feb. 26, 2019

(65) Prior Publication Data

US 2019/0286129 A1    Sep. 19, 2019

(30) Foreign Application Priority Data

Mar. 16, 2018    (JP) .............................. JP2018-049190

(51) Int. Cl.
*G05D 1/00*    (2006.01)

(52) U.S. Cl.
CPC .......... *G05D 1/0061* (2013.01); *G05D 1/0088* (2013.01); *G05D 2201/0213* (2013.01)

(58) Field of Classification Search
CPC .............. G05D 1/0061; G05D 1/0088; G05D 2201/0213; G05D 1/00; G08G 1/202; G06Q 50/30; G06Q 10/02; B60W 30/18; B60W 40/08; B60W 2040/0809; G07C 9/00309; H04L 67/025; H04L 67/12; H04L 63/0876; H04L 67/18

USPC .......................................................... 701/27
See application file for complete search history.

(56) References Cited

U.S. PATENT DOCUMENTS

| | | | |
|---|---|---|---|
| 10,901,415 B1* | 1/2021 | Herbach | G05D 1/0088 |
| 2014/0129113 A1* | 5/2014 | Van Wiemeersch | F02D 28/00 |
| | | | 701/102 |
| 2017/0174180 A1* | 6/2017 | Hoyos | H04L 63/0861 |
| 2017/0285634 A1* | 10/2017 | Chin | B60R 25/24 |
| 2018/0150074 A1* | 5/2018 | Hashimoto | B60K 28/02 |
| 2018/0314988 A1* | 11/2018 | Harada | G08G 1/00 |
| 2019/0086917 A1* | 3/2019 | Okimoto | B60W 30/00 |
| 2019/0088036 A1* | 3/2019 | Van Wiemeersch | |
| | | | G07F 17/0057 |
| 2020/0349345 A1* | 11/2020 | Hodge | G06Q 30/08 |

FOREIGN PATENT DOCUMENTS

JP    2016-115364    6/2016

\* cited by examiner

*Primary Examiner* — Shardul D Patel
(74) *Attorney, Agent, or Firm* — Amin, Turocy & Watson, LLP (57) ABSTRACT

A vehicle use system includes an authentication information assignor that assigns authentication information for using a vehicle to a user, an authenticator (180) that acquires the authentication information to permit use of the vehicle, at least a part of the authenticator being mounted in the vehicle (100), and a driving controller (220, 260) that automatedly controls acceleration, deceleration, and steering of the vehicle, in which the authentication information assignor assigns the authentication information in which constraints are applied to both a time period and an area in which traveling is possible to the user, and the driving controller enables the user to use the vehicle in a range of the constraints applied to the authentication information.

9 Claims, 9 Drawing Sheets

VEHICLE USE SYSTEM

CROSS-REFERENCE TO RELATED APPLICATION

Priority is claimed on Japanese Patent Application No. 2018-049190, filed Mar. 16, 2018, the content of which is incorporated herein by reference.

BACKGROUND

Field of the Invention

The present invention relates to a vehicle use system.

Description of Related Art

In recent years, research on automated control of vehicles has been proceeding. In relation thereto, a vehicle allocation management system including a vehicle allocation management server and automatedly driven vehicles, so that the vehicle allocation management server allocates an automatedly driven vehicle to a user on the basis of a vehicle allocation request that the user sends to the vehicle allocation management server has been disclosed (for example, Japanese Unexamined Patent Application, First Publication No. 2016-115364). In this system, the automatedly driven vehicle includes a first communication means that wirelessly communicates with the vehicle allocation management server, a first storage means that stores first information for authentication reference of the user in advance, a first authentication means that determines whether or not to authenticate the user using the acquired first authentication information of the user and the first information for authentication reference stored in the first storage means, a second authentication means that transmits the acquired information for authentication reference to the vehicle allocation management server and determines whether or not to authenticate the user according to a result of confirmation authentication received from the vehicle allocation management server in response thereto, and a determination means that determines that use of a subject vehicle is enabled when the user can be authenticated by the first authenticator and the user can be authenticated by the second authenticator.

SUMMARY

In the related art, when an automatedly-driven vehicle is lent to another user, circumstances after rental have not been sufficiently considered. Therefore, it may not be possible to realize smooth lending and borrowing of the vehicle.

An aspect of the present invention has been made in consideration of such circumstances, and an object of an aspect of the present invention is to provide a vehicle use system that can realize smooth lending and borrowing of a vehicle.

The vehicle use system according to the present invention adopts the following configuration.

(1) A vehicle use system according to an aspect of the present invention includes: an authentication information assignor that assigns authentication information for using a vehicle to a user; an authenticator that acquires the authentication information to permit use of the vehicle, at least a part of the authenticator being mounted in the vehicle; and a driving controller that automatedly controls acceleration, deceleration, and steering of the vehicle, wherein the authentication information assignor assigns the authentication information in which constraints are applied to both a time period and an area in which traveling is possible by the user, and the driving controller enables the user to use the vehicle in a range of the constraints applied to the authentication information.

(2) In the aspect (1), the authentication information is information that is assigned each time the user uses the vehicle once.

(3) In the aspect (1), the authentication information assignor assigns authentication information in which the constraint that the vehicle is available only in automated driving is further applied, to the user, and the driving controller prohibits manual driving of the vehicle of the user when the authentication information in which the constraint that only automated driving is available is applied is acquired by the authenticator.

(4) In the aspect (1), the authentication information assignor assigns authentication information to which constraints on an occupant configuration are further applied, to the user, the vehicle use system further includes a first occupant configuration recognizer that is mounted in the vehicle and recognizes an occupant configuration of occupants before the occupants get in the vehicle, and the authenticator does not permit use of the vehicle when the occupant configuration recognized by the first occupant configuration recognizer is not suitable for the constraints applied to the authentication information acquired by the authenticator.

(5) In the aspect (1), the authentication information assignor assigns the authentication information to which constraints on an occupant configuration are further applied, to the user, the vehicle use system further includes a second occupant configuration recognizer that is mounted in the vehicle and recognizes an occupant configuration of occupants after the occupants get in the vehicle, and the authenticator does not permit use of the vehicle when the occupant configuration recognized by the second occupant configuration recognizer is not suitable for the constraints applied to the authentication information acquired by the authenticator.

(6) In the aspect (4), the constraints on the occupant configuration include constraints on animals.

(7) In the aspect (1), the authentication information assignor assigns the authentication information in which constraints on smoking are further applied, to the user, the vehicle use system further includes a smoking recognizer that is mounted in the vehicle and recognizes smoking of an occupant including the user, and the driving controller stopping use of the vehicle of the user when constraints on smoking have been applied to the authentication information acquired by the authenticator and smoking of the occupant is recognized by the smoking recognizer.

(8) Another aspect of the present invention is a vehicle use system including: an authentication information assignor that assigns authentication information for using a vehicle to a user; an authenticator that acquires the authentication information to permit use of the vehicle, at least a part of the authenticator being mounted in the vehicle; and a driving controller that automatedly controls acceleration, deceleration, and steering of the vehicle, wherein the authentication information assignor assigns the authentication information in which a constraint that only automated driving is available is applied, to the user, and the driving controller prohibits manual driving of the vehicle of the user when the authentication information in which the constraint that only automated driving is available is applied is acquired by the authenticator.

(9) Another aspect of the present invention is a vehicle use system including: an authentication information assignor that assigns authentication information for using a vehicle to a user; an authenticator that acquires the authentication information to permit use of the vehicle, at least a part of the authenticator being mounted in the vehicle; and an occupant configuration recognizer that is mounted in the vehicle and recognizes an occupant configuration of occupants including the user before the user gets in the vehicle, wherein the authentication information assignor assigns the authentication information in which constraints on an occupant configuration are applied, to the user, and the authenticator does not permit use of the vehicle when the occupant configuration recognized by the occupant configuration recognizer is not suitable for the constraints applied to the authentication information acquired by the authenticator.

According to the aspects (1) to (9), it is possible to realize smooth lending and borrowing of vehicles.

DESCRIPTION OF EMBODIMENTS

Hereinafter, embodiments of a vehicle use system of the present invention will be described with reference to the drawings.

First Embodiment

Figure 1:
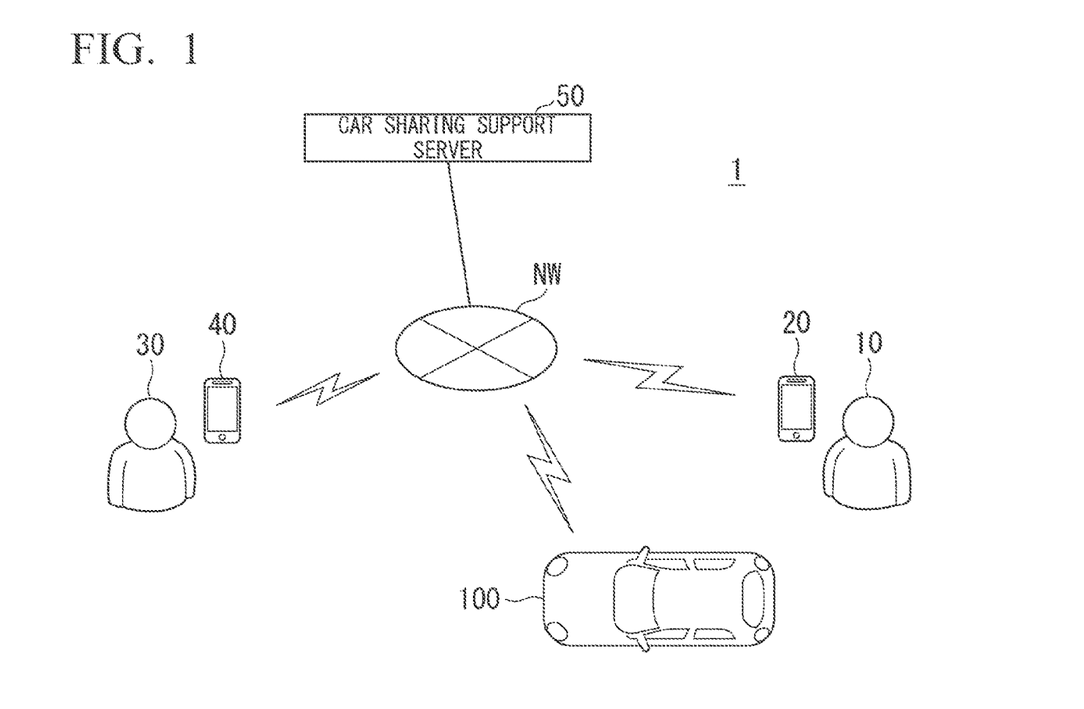
FIG. 1 is a conceptual diagram of a vehicle use system.

FIG. 1 is a conceptual diagram of a vehicle use system 1. In the vehicle use system 1, for example, an owner 10 of a vehicle 100 lends the vehicle 100 to a user 30. The vehicle 100 is a vehicle having an automated driving function and may be a vehicle that can travel in an unmanned manner. The owner 10 accesses the car sharing support server 50 using the terminal device 20. The user 30 accesses the car sharing support server 50 using the terminal device 40. The terminal device 20 is a mobile phone such as a smartphone, a tablet terminal, or a personal computer. The same applies to the terminal device 40, but it is preferable for a means for assigning the authentication information for using the vehicle 100 to the user 30 to be, for example, a mobile terminal device having a wireless communication device. In the following description, it is assumed that the authentication information is assigned to the terminal device 40. Each component illustrated in FIG. 1 includes an interface for access to a network NW. The network NW includes, for example, the Internet, a wide area network (WAN), a local area network (LAN), or a cellular network. An interface for access to the network NW is a wireless communication device, a network card, or the like. The owner 10 and the user 30 may be acquaintances or strangers.

Figure 2:
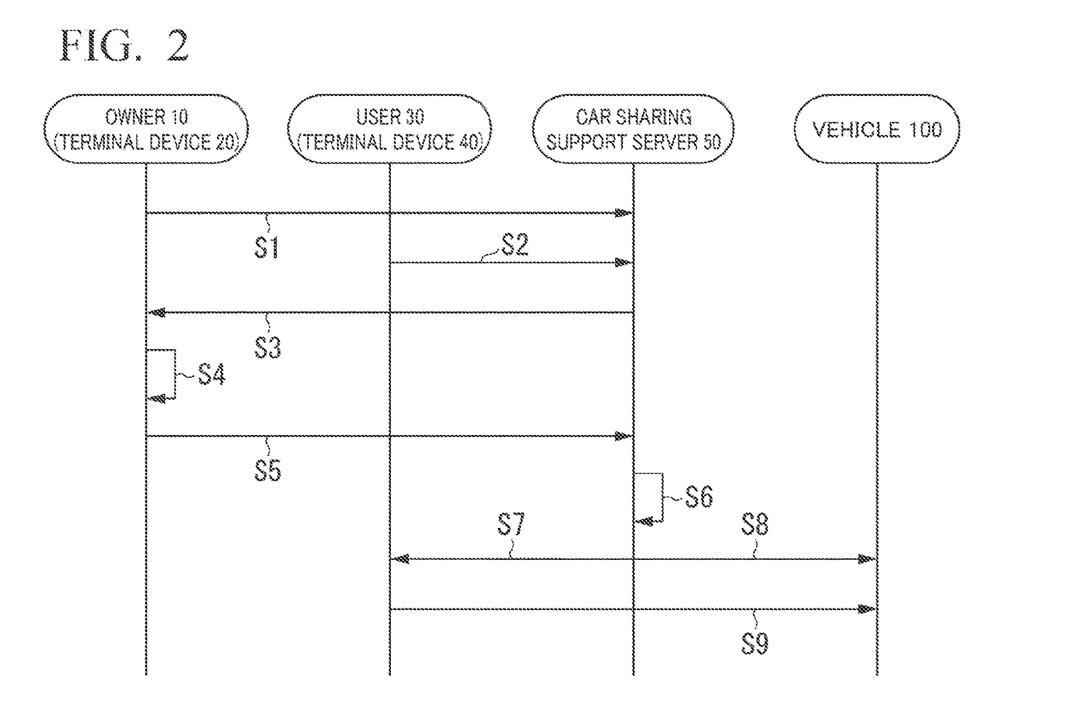
FIG. 2 is a sequence diagram illustrating an example of a flow of an overall process in a vehicle use system.

FIG. 2 is a sequence diagram illustrating an example of an overall flow of a process in the vehicle use system 1. First, the owner 10 accesses the car sharing support server 50 using the terminal device 20, and performs vehicle lending registration (step S1). In this case, the owner 10 registers a schedule information including a time period in which the vehicle 100 can be lent, in the car sharing support server 50.

The user 30 accesses the car sharing support server 50 using the terminal device 40 and makes an application for rental (step S2). In this case, the user 30 performs registration regarding desired rental conditions. The rental conditions registered by the user 30 include, for example, information such as the number of occupants who ride in the vehicle 100, a time period when the vehicle 100 is used, and departure and arrival places. The rental conditions registered by the user 30 may include an area in which traveling is possible, in which the vehicle 100 can be used. The area in which traveling is possible is, for example, an area that is defined in an administrative division or the like. The car sharing support server 50 may determine the area in which traveling is possible to include an area in a range of a normally-available detour on the basis of a time period in which the vehicle 100 is to be used, a departure place, and an arrival place, and add the area to the rental conditions, instead of the user 30 registering the area in which traveling is possible. Further, the rental conditions may include information on a rental consideration (which is not limited to cash, but may be various benefits).

The car sharing support server 50 transmits the rental conditions to the terminal device 20 of the owner 10 (step S3). When the owner 10 approves the rental conditions, the owner 10 inputs an indication indicating approval to the terminal device 20 (step S4). The terminal device 20 transmits the indication indicating approval to the car sharing support server 50 (step S5).

The car sharing support server 50 generates authentication information (step S6). The authentication information is information in which constraints information that restricts a use range of the vehicle 100 on the basis of the rental conditions is attached to an authentication token necessary for a use scene of the vehicle 100. The authentication token is information that includes at least some identification information, and to which key information or the like is added as necessary. The authentication information is information assigned each time the vehicle 100 is used once. The car sharing support server 50 transmits the authentication information to the terminal device 40 of the user 30 (step S7), and transmits at least the authentication token to the vehicle 100 (step S8). Here, only the authentication token may be transmitted to the terminal device 40 of the user 30, and all the authentication information may be transmitted to the vehicle 100.

The user 30 can approach the vehicle 100 while bringing the terminal device 40 and use the vehicle 100 through an authentication process (step S9) that is performed between the terminal device 40 and the vehicle 100. Here, the user 30 may go to a parking place of the vehicle 100 or the vehicle 100 may pick up the user 30 in an unmanned manner.

Hereinafter, components of the vehicle use system 1 will be described. A general-purpose device may be used as the terminal device 20 of the owner 10, and detailed description thereof will be omitted. The terminal device 20 accesses the car sharing support server 50 by a browser and an application program being activated, receives an input of the owner 10 while displaying a service screen, and transmits content of the input to the car sharing support server 50.

[Terminal Device]

Figure 3:
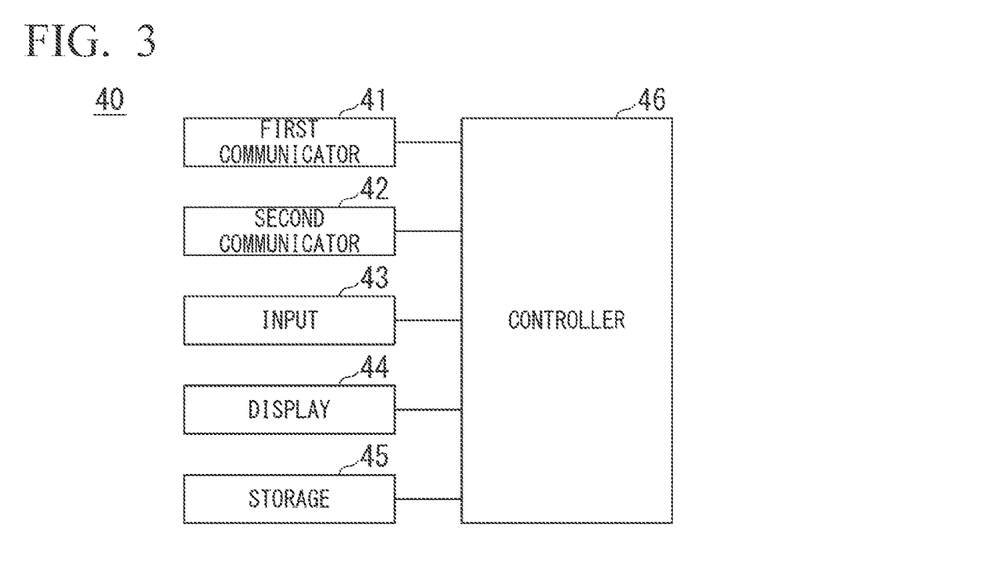
FIG. 3 is a diagram illustrating an example of a configuration of a terminal device.

FIG. 3 is a diagram illustrating an example of a configuration of the terminal device 40. The terminal device 40 includes, for example, a first communicator 41, a second communicator 42, an input 43, a display 44, a storage 45, and a controller 46.

The first communicator 41 is a communication device for access to the network NW. The second communicator 42 is a communication device for communicating with the authentication communication device 182 (to be described below) of the vehicle 100. The first communicator 41 and the second communicator 42 may be separate devices or one device may be used in common. As an example, the first communicator 41 is a communication device for accessing a cellular network or a Wi-Fi network, and the second communicator 42 is a communication device that performs short range wireless communication such as Bluetooth (registered trademark), dedicated short range communications (DSRC), infrared communication, or near field communication (NFC).

The input 43 includes a touch panel formed integrally with the display 44, various buttons, and the like. The display 44 is, for example, a liquid crystal display (LCD) or an organic electroluminescence (EL) display device. The storage 45 is, for example, a flash memory or a random access memory (RAM). The controller 46 operates by a processor such as a central processing unit (CPU) executing a program stored in the storage 45.

Figure 4:
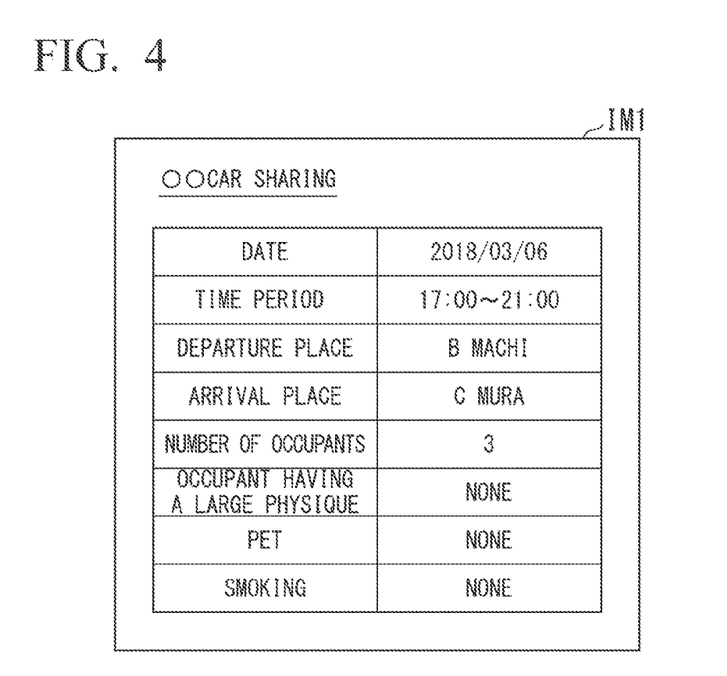
FIG. 4 is a diagram illustrating an example of a rental application screen.

The controller 46 causes the display 44 to display a screen for application for rental according to a predetermined operation of the user 30. FIG. 4 is a diagram illustrating an example of a rental application screen IM1. On the rental application screen IM1, the user 30 inputs rental conditions such as a date, a time period, a departure place, an arrival place, the number of occupants, the presence or absence of an occupant having a large physique (for example, an occupant having a height of 2 m or more or a body weight of 100 kg or more), the presence or absence of an accompanying pet, and the presence or absence of smoking.

The controller 46 causes the authentication information received from the car sharing support server 50 when the rental is approved to be stored in the storage 45. The controller 46 causes the second communicator 42 to transmit a signal including information obtained by encoding the authentication information to the surroundings according to an operation of the user 30 performed with respect to the input 43. The display may be used instead of the second communicator, and code information such as QR code (registered trademark) obtained by encoding the authentication information may be displayed and read by a reader device of the vehicle 100.

[Car Sharing Support Server]

Figure 5:
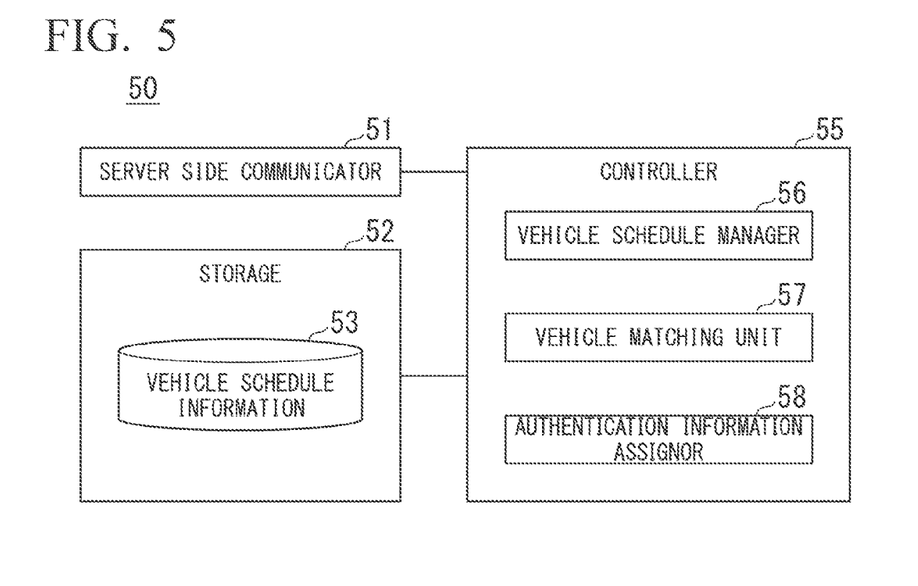
FIG. 5 is a diagram illustrating an example of a configuration of a car sharing support server.

FIG. 5 is a diagram illustrating an example of a configuration of the car sharing support server 50. The car sharing support server 50 includes, for example, a server side communicator 51, a storage 52, and a controller 55. The server side communicator 51 is a communication device for access to the network NW. The storage 52 is a hard disk drive (HDD), a flash memory, a RAM, or the like. Information such as vehicle schedule information 53 is stored in the storage 52. The car sharing support server 50 functions as, for example, a web server or an application server.

The controller 55 includes, for example, a vehicle schedule manager 56, a vehicle matching unit 57, and an authentication information assignor 58. Each of these components is realized, for example, by a hardware processor such as a CPU executing a program (software). Some or all of these components may be realized by hardware (including circuitry) such as a large scale integration (LSI), an application specific integrated circuit (ASIC), a field-programmable gate array (FPGA), or a graphics processing unit (GPU) or may be realized by software and hardware in cooperation. The program may be stored in the storage 52 in advance or may be stored in a detachable storage medium such as a DVD or a CD-ROM and installed by the storage medium being mounted in the drive device.

Figure 6:
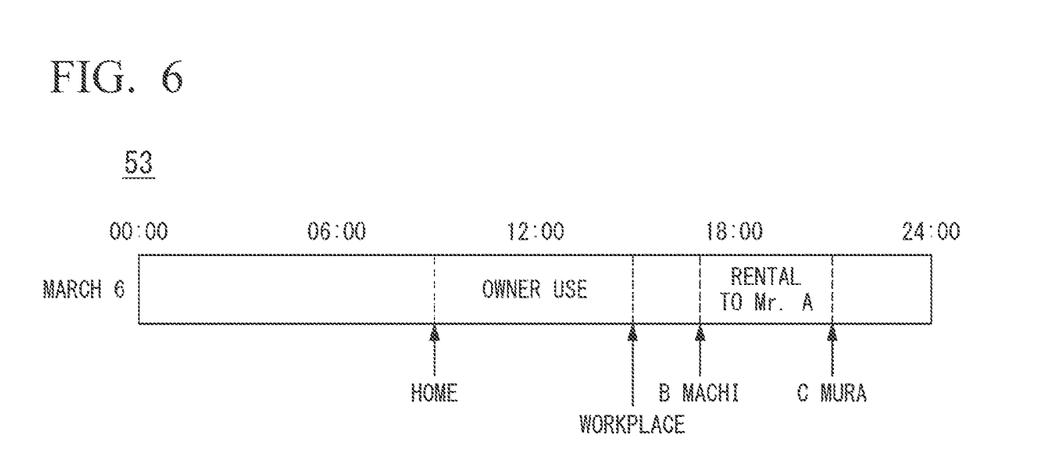
FIG. 6 is a diagram schematically illustrating content of vehicle schedule information.

The vehicle schedule manager 56 creates the vehicle schedule information 53 for each vehicle 100, for example, on the basis of the information acquired from the terminal device 20 of the owner 10. The vehicle schedule manager 56 adds an approved rental schedule to the vehicle schedule information 53 according to approval of the application for rental from the user 30. FIG. 6 is a diagram schematically illustrating content of the vehicle schedule information 53. As illustrated in FIG. 6, the vehicle schedule information 53 is information that defines whether the owner 10 uses the vehicle or whether the vehicle is lent to a user for each time period. The vehicle schedule information 53 defines location information of the vehicle 100 at a start time and an end time of each use time period. The location information of the vehicle 100 is acquired as schedule registration from the terminal device 20 with respect to a use time period of the owner 10, and is acquired from information on the departure place and the arrival place included in the application for rental from the terminal device 40 with respect to a use time period of the user 30.

The vehicle matching unit 57 refers to the vehicle schedule information 53 and extracts the vehicle 100 suitable for the rental conditions. For example, the vehicle matching unit 57 searches for the vehicle 100 satisfying conditions that (1) the use of the owner 10 or another user 30 is not registered in a date and a time period in which rental is desired, (2) the vehicle 100 can arrive at a departure place by a use start time, and (3) the vehicle 100 can move from an arrival place at a use end time to a departure place at the next use start time, and extracts the vehicle 100 suitable for the conditions. The vehicle matching unit 57 may extract the vehicle 100 suitable for individual conditions (for example, smoking NG, a pet NG (more specifically, for example, a dog is good but a cat is NG), and an occupant having a large physique is NG (prevention of deterioration of sheets)) determined by the owner 10 for each vehicle 100 in advance, and the rental conditions.

In response to the approval of the application for rental from the user 30, the authentication information assignor 58 generates authentication information corresponding to the rental conditions and transmits the authentication information to the terminal device 40 of the user 30 together with the authentication token using the server side communicator 51. The authentication information is information including vehicle identification information or the like, in addition to the rental condition.

[Vehicle]

Figure 7:
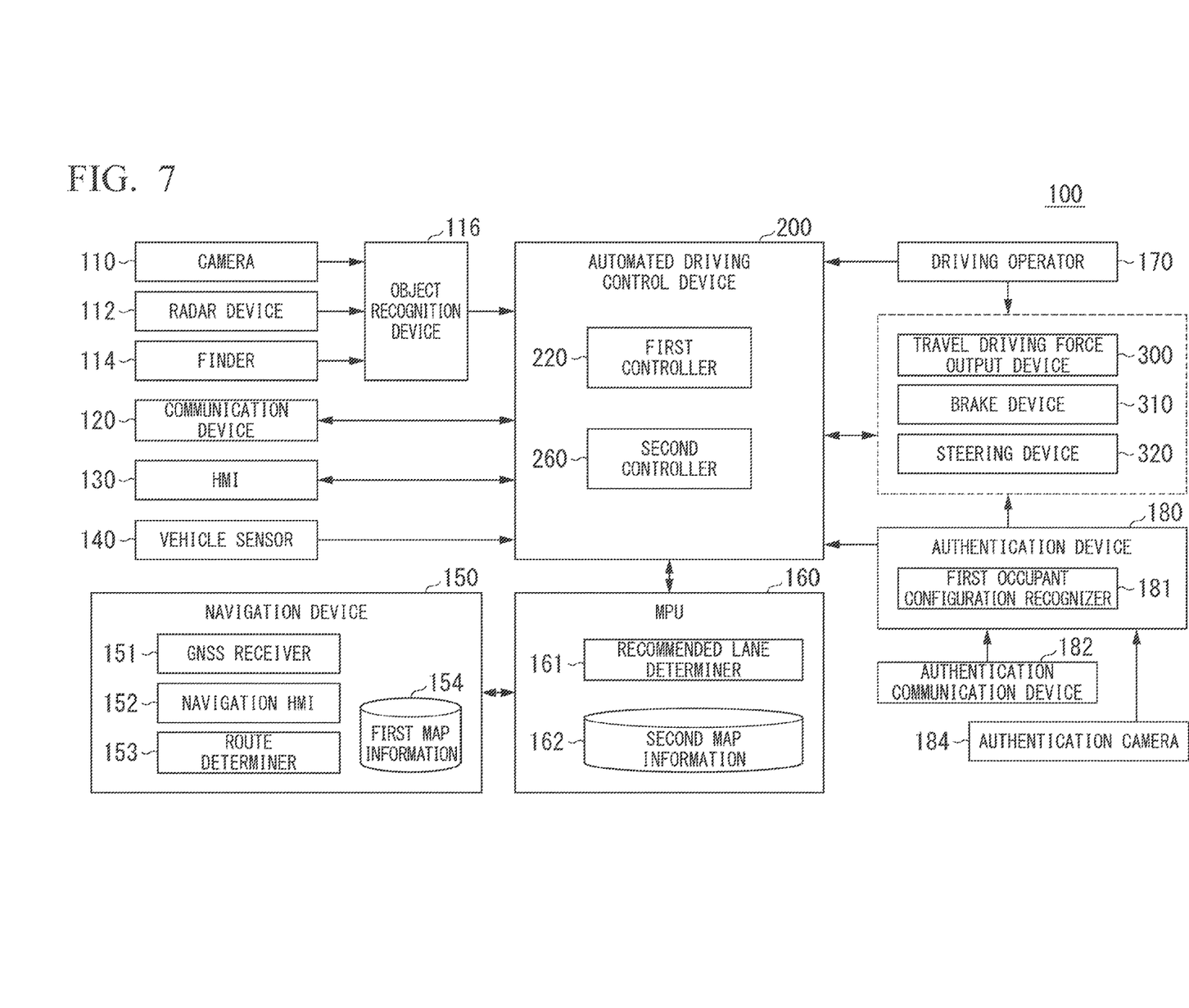
FIG. 7 is a diagram illustrating an example of a configuration of various devices mounted on a vehicle.

FIG. 7 is a diagram illustrating an example of a configuration of various devices installed in the vehicle 100. The vehicle 100 is, for example, a vehicle having a vehicle cabin such as a three-wheeled vehicle or a four-wheeled vehicle. A driving source thereof is an internal combustion engine such as a diesel engine or a gasoline engine, an electric motor, or a combination thereof. The electric motor operates using power generated by a power generator connected to the internal combustion engine, or discharge power of a secondary battery or a fuel cell.

The vehicle 100 includes, for example, a camera 110, a radar device 112, a finder 114, an object recognition device 116, a communication device 120, a human machine interface (HMI) 130, a vehicle sensor 140, a vehicle sensor 140, a navigation device 150, a map positioning unit (MPU) 160, a driving operator 170, an authentication device 180, an authentication communication device 182, an authentication camera 184, an automated driving control device 200, a travel driving force output device 300, a brake device 310, and a steering device 320. The apparatuses or devices are connected to each other by a multiplex communication line such as a controller area network (CAN) communication line, a serial communication line, a wireless communication network, or the like. The configuration illustrated in FIG. 1 is merely an example, and a part of the configuration may be omitted, or other configurations may be added.

The camera 110 is, for example, a digital camera using a solid-state imaging element such as a charge coupled device (CCD) or a complementary metal oxide semiconductor (CMOS). The camera 110 is attached to any places on a vehicle (hereinafter, the vehicle 100) in which the vehicle use system 1 is mounted. In the case of imaging in front, the camera 110 is attached to an upper portion of a front windshield, a rear back of a rearview mirror, or the like. The camera 110, for example, periodically repeatedly images the surroundings of the vehicle 100. The camera 110 may be a stereo camera.

The radar device 112 radiates radio waves such as millimeter waves to the vicinity of the vehicle 100 and detects radio waves (reflected waves) reflected by an object to detect at least a position (distance and orientation) of the object. The radar device 112 is attached to any place on the vehicle 100. The radar device 112 may detect a position and a speed of an object using a frequency modulated continuous wave (FM-CW) scheme.

The finder 14 is light detection and ranging (LIDAR). The finder 114 irradiates the periphery of the vehicle 100 with light and measures scattered light. The finder 114 detects a distance to a target on the basis of a time from light emission to light reception. The radiated light is, for example, pulsed laser light. The finder 114 is attached to an arbitrary place on the vehicle 100.

The object recognition device 116 performs a sensor fusion process on detection results of some or all of the camera 110, the radar device 112, and the finder 114 to recognize a position, type, speed, and the like of an object. The object recognition device 16 outputs recognition results to the automated driving control device 200. The object recognition device 116 may output detection results of the camera 110, the radar device 112, or the finder 114 to the automated driving control device 200 as they are. The object recognition device 116 may be omitted from the vehicle use system 1.

The communication device 120, for example, communicates with another vehicle around the vehicle 100 using a cellular network, a Wi-Fi network, or the like or communicates with various server devices via a wireless base station.

The HMI 130 presents various types of information to an occupant of the vehicle 100 and receives an input operation from the occupant. The HMI 130 includes various display devices, speakers, buzzers, touch panels, switches, keys, and the like.

The vehicle sensor 140 includes, for example, a vehicle speed sensor that detects a speed of the vehicle 100, an acceleration sensor that detects an acceleration, a yaw rate sensor that detects an angular velocity around a vertical axis, and an orientation sensor that detects a direction of the vehicle 100.

The navigation device 150 includes, for example, a global navigation satellite system (GNSS) receiver 151, a navigation HMI 152, and a route determiner 153. The navigation device 150 holds first map information 154 in a storage device such as a hard disk drive (HDD) or a flash memory. The GNSS receiver 151 specifies a position of the vehicle 100 on the basis of a signal received from a GNSS satellite. The position of the vehicle 100 may be specified or supplemented by an inertial navigation system (INS) using an output of the vehicle sensor 140. The navigation HMI 152 includes a display device, a speaker, a touch panel, keys, and the like. The navigation HMI 152 may be partly or wholly shared with the above-described HMI 130. The route determiner 153, for example, determines a route (hereinafter, an on-map route) from the position of the vehicle 100 (or any input position) specified by the GNSS receiver 151 to a destination input by the occupant using the navigation HMI 152 by referring to the first map information 154. The first map information 154 is, for example, information in which a road shape is represented by links indicating roads and nodes connected by the links. The first map information 154 may include a curvature of the road, point of interest (POI) information, and the like. The on-map route is output to the MPU 160. The navigation device 150 may perform route guidance using the navigation HMI 152 on the basis of the on-map route. The navigation device 150 may be realized, for example, by a function of a terminal device such as a smartphone or a tablet terminal possessed by the occupant. The navigation device 150 may transmit a current position and a destination to a navigation server via the communication device 120 and acquire the same route as the on-map route from the navigation server.

The MPU 160 includes, for example, a recommended lane determiner 161, and holds second map information 162 in a storage device such as an HDD or a flash memory. The recommended lane determiner 161 divides the on-map route provided from the navigation device 150 into a plurality of blocks (for example, divides the route every 100 [m] in a progression direction of the vehicle), and determines a recommended lane for each block by referring to the second map information 162. The recommended lane determiner 161 determines in which lane from the left the vehicle 100 travels. The recommended lane determiner 161 determines the recommended lane so that the vehicle 100 can travel on a reasonable route for progression to a branch destination when there is a branch place in the on-map route.

The second map information 162 is map information with higher accuracy than the first map information 154. The second map information 162 includes, for example, information on a center of the lane or information on a boundary of the lane. The second map information 162 may include road information, traffic regulations information, address information (address and zip code), facility information, telephone number information, and the like. The second map information 162 may be updated at any time by the communication device 120 communicating with another device.

The driving operator 170 includes, for example, an accelerator pedal, a brake pedal, a shift lever, a steering wheel, a modified steering wheel, a joystick, and other operators. A sensor that detects the amount of operation or the presence or absence of the operation is attached to the driving operator 170, and a result of the detection is output to the automated driving control device 200 or some or all of the travel driving force output device 300, the brake device 310, and the steering device 320.

The authentication device 180 authenticates an occupant who uses the vehicle 100 using the authentication communication device 182 or the authentication camera 184. This will be described below.

The automated driving control device 200 includes, for example, a first controller 220, and a second controller 260. The first controller 220 and the second controller 260 are realized, for example, by a hardware processor such as a CPU executing a program (software). Some or all of these components may be realized by hardware (including circuitry) such as an LSI, an ASIC, an FPGA, or a GPU or may be realized by software and hardware in cooperation. The program may be stored in a storage device such as an HDD or a flash memory of the automated driving control device 200 in advance or may be stored in a removable storage medium such as a DVD or a CD-ROM and the storage medium may be mounted in a drive device so that the program is installed in the HDD or the flash memory of the automated driving control device 200.

Figure 8:
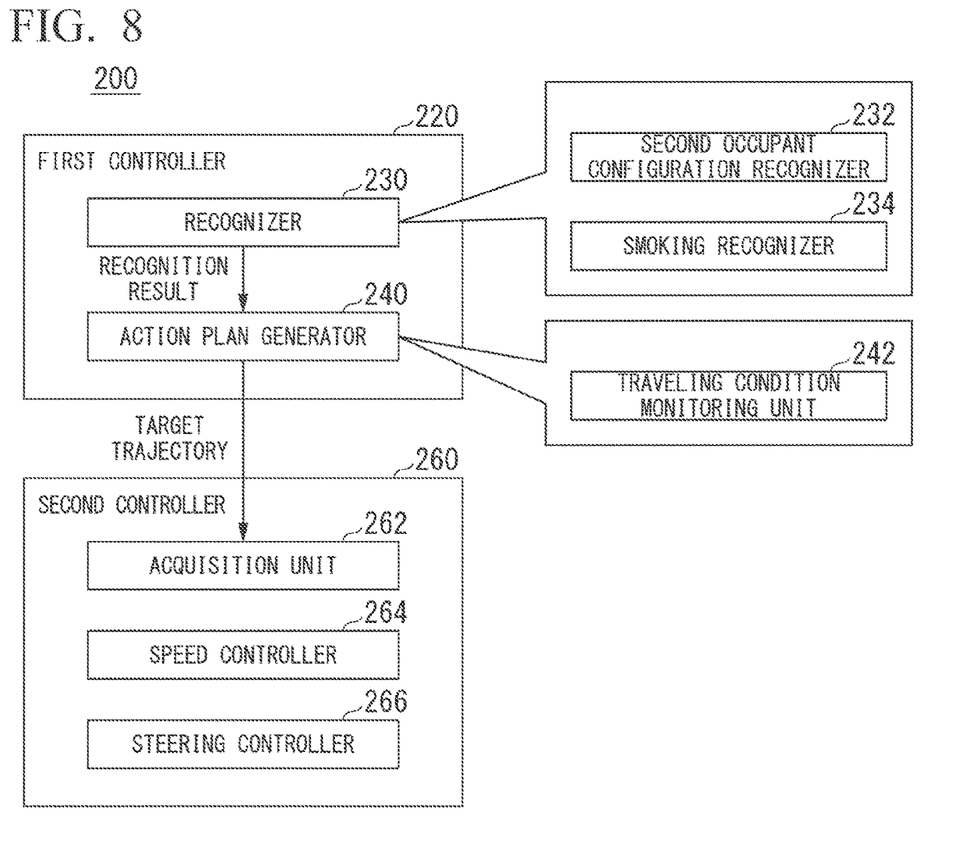
FIG. 8 is a functional configuration diagram of a first controller and a second controller.

FIG. 8 is a functional configuration diagram of the first controller 220 and the second controller 260. The first controller 220 includes, for example, a recognizer 230 and an action plan generator 240. The first controller 220, for example, realizes a function based on artificial intelligence (AI) and a function based on a previously given model in parallel. For example, in a function of "recognizing an intersection," recognition of the intersection using deep learning or the like and recognition based on previously given conditions (a signal which can be subjected to pattern matching, a road sign, or the like) are executed in parallel, and the function of recognizing an intersection is realized by scoring both recognitions and comprehensively evaluating the recognitions. Accordingly, the reliability of automated driving is guaranteed.

The recognizer 230 recognizes a state such as a position, a speed, or acceleration of an object around the vehicle 100 on the basis of the information input from the camera 110, the radar device 112, and the finder 114 via the object recognition device 116. The position of the object is recognized as a position on absolute coordinates with a representative point (centroid, a driving axis center, or the like) of the vehicle 100 as an origin, and is used for control. The position of the object may be represented by a representative point such as a centroid or a corner of the object or may be represented by a represented area. The "state" of the object may include an acceleration, a jerk, or a "state of action" (for example, whether the object is changing lane or trying to change lane) of the object.

The recognizer 230 recognizes, for example, a lane (traveling lane) in which the vehicle 100 is traveling. For example, the recognizer 230 compares a pattern of a road marking line (for example, an arrangement of a solid line and a broken line) obtained from the second map information 162 with a pattern of a road marking line around the vehicle 100 recognized from the image captured by the camera 110 to recognize the traveling lane. The recognizer 230 may recognize not only the road marking lines but also a traveling road boundary (a road boundary) including the road marking line, a road shoulder, a curb, a median strip, a guard rail, or the like to recognize the traveling lane. In this recognition, the position of the vehicle 100 acquired from the navigation device 150 or a processing result of an INS may be added. The recognizer 230 recognizes a temporary stop line, an obstacle, a red light, a toll gate, a road structure, and other road events.

The recognizer 230 recognizes a position or a posture of the vehicle 100 relative to the traveling lane when recognizing the traveling lane. The recognizer 230 may recognize, for example, a deviation of a reference point of the vehicle 100 from a center of the lane, and an angle formed between a progression direction of the vehicle 100 and a line connecting a center of the lane as a relative position and a posture of the vehicle 100 with respect to the traveling lane. Instead, the recognizer 230 may recognize, for example, a position of the reference point of the vehicle 100 with respect to any one of side end portions (the road marking line or the road boundary) of the traveling lane as the relative position of the vehicle 100 with respect to the traveling lane.

The recognizer 230 includes a second occupant configuration recognizer 232 that recognizes an occupant configuration of an occupant that is in the vehicle cabin, and a smoking recognizer 234. The second occupant configuration recognizer 232 recognizes the number of occupants inside the vehicle, a physique, the presence or absence of a pet, and the like on the basis of output from an in-vehicle camera, a seat pressure sensor (not illustrated), or the like. The smoking recognizer 234 recognizes the presence or absence of smoking of the occupant in the vehicle cabin on the basis of output of a smoke sensor, an in-vehicle sensor (not illustrated), and the like.

In principle, the action plan generator 240 generates a target trajectory along which the vehicle 100 will travel in the future automatedly (without depending on an operation of a driver) so that the vehicle 100 can travel on the recommended lane determined by the recommended lane determiner 161 and cope with a surrounding situation of the vehicle 100. The target trajectory includes, for example, a speed element. For example, the target trajectory is represented as a sequence of points (trajectory points) to be reached by the vehicle 100. The trajectory point is a point that the vehicle 100 is to reach for each predetermined travel distance (for example, several meters) at a road distance, and a target speed and a target acceleration at every predetermined sampling time (for example, several tenths of a [sec]) are separately generated as part of the target trajectory. The trajectory point may be a position that the vehicle 100 is to reach at the sampling time at every predetermined sampling time. In this case, information on the target speed or the target acceleration is represented by the interval between the trajectory points.

When the action plan generator 240 generates the target trajectory, the action plan generator 240 may set an event of automated driving. Examples of the automated driving event include a constant speed traveling event, a low speed following driving event, a lane changing event, a branching event, a merging event, a takeover event, and the like. The action plan generator 240 generates a target trajectory according to an activated event.

The action plan generator 240 further includes a traveling condition monitoring unit 242. This will be described below.

The second controller 260 controls the travel driving force output device 300, the brake device 310, and the steering device 320 so that the vehicle 100 passes through the target trajectory generated by the action plan generator 240 at a scheduled time.

The second controller 260 includes, for example, an acquisition unit 262, a speed controller 264, and a steering controller 266. The acquisition unit 262 acquires information on the target trajectory (trajectory points) generated by the action plan generator 240 and stores the information on the target trajectory in a memory (not illustrated). The speed controller 264 controls the travel driving force output device 300 or the brake device 310 on the basis of the speed element incidental to the target trajectory stored in the memory. The steering controller 266 controls the steering device 320 according to a degree of bend of the target trajectory stored in the memory. Processes of the speed controller 264 and the steering controller 266 are realized by, for example, a combination of feedforward control and feedback control. For example, the steering controller 266 executes a combination of feedforward control according to a curvature of a road in front of the vehicle 100 and feedback control based on a deviation from the target trajectory.

Referring back to FIG. 7, the travel driving force output device 300 outputs a travel driving force (torque) for traveling of the vehicle to the driving wheels. The travel driving force output device 300 includes, for example, a combination of an internal combustion engine, an electric motor, a transmission, and the like, and an ECU that controls these. The ECU controls the above configuration according to information input from the second controller 260 or information input from the driving operator 170.

The brake device 310 includes, for example, a brake caliper, a cylinder that transfers hydraulic pressure to the brake caliper, an electric motor that generates hydraulic pressure in the cylinder, and a brake ECU. The brake ECU controls the electric motor according to information input from the second controller 260 or information input from the driving operator 170 so that a brake torque according to a braking operation is output to each wheel. The brake device 310 may include a mechanism that transfers the hydraulic pressure generated by the operation of the brake pedal included in the driving operator 170 to the cylinder via a master cylinder as a backup. The brake device 310 is not limited to the configuration described above and may be an electronically controlled hydraulic brake device that controls the actuator according to information input from the second controller 260 and transfers the hydraulic pressure of the master cylinder to the cylinder.

The steering device 320 includes, for example, a steering ECU and an electric motor. The electric motor, for example, changes a direction of the steerable wheels by causing a force to act on a rack and pinion mechanism. The steering ECU drives the electric motor according to information input from the second controller 260 or information input from the driving operator 170 to change the direction of the steerable wheels.

[Authentication Process]

Hereinafter, an authentication process of the authentication device 180 will be described. The authentication communication device 182 communicates with the second communicator 42 of the terminal device 40. Accordingly, the authentication communication device 182 performs short range wireless communication such as Bluetooth, DSRC, infrared communication, or NFC. The authentication communication device 182 acquires authentication information from the terminal device 40 and outputs the authentication information to the authentication device 180. A reader device that optically reads information from a QR code or the like may be used instead of (or in addition to) the authentication communication device 182.

The authentication camera 184 images the outside of the vehicle 100. The camera 110 may be used as the authentication camera 184. The authentication camera 184 may include a camera that images a vehicle cabin of the vehicle 100. The authentication camera 184 images the outside of the vehicle 100 according to an instruction from the authentication device 180 and outputs data of a captured image to the authentication device 180.

Figure 9:
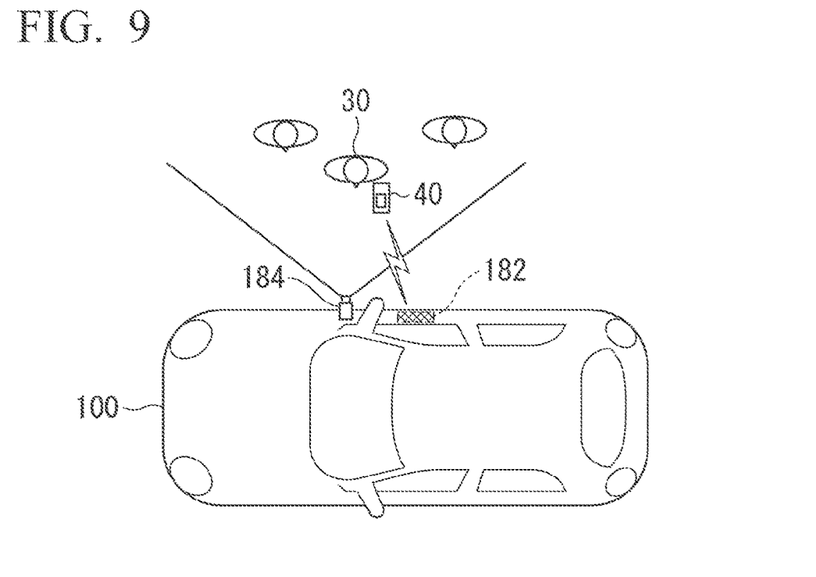
FIG. 9 is a diagram illustrating a state in which an authentication communication device and an authentication camera operate.

FIG. 9 is a diagram illustrating a state in which the authentication communication device 182 and the authentication camera 184 are operating. As illustrated in FIG. 9, the authentication communication device 182 is provided in the vicinity of the exterior part of the vehicle 100 and communicates with at least the terminal device 40 that is outside the vehicle 100. The authentication camera 184 is attached in a state in which a lens is exposed to the outside, in the exterior part of the vehicle 100. Alternatively, the authentication camera 184 may be provided in the vehicle cabin and may image the outside of the vehicle 100 through the windshield. In the authentication camera 184, an optical system is set to have a certain imaging angle in a horizontal direction, and a focus or the like is adjusted so that a captured image from which a person present up to a distance of about several meters to ten of meters can be recognized. It is preferable for the ranges in which the authentication communication device 182 and the imaging range of the authentication camera 184 are able to communicate to overlap at least partially.

As illustrated in FIG. 8, rules are determined so that occupants who intend to use the vehicle 100 gather at a predetermined position with respect to the vehicle 100 and wait for completion of authentication before getting in the vehicle 100. In this case, when the authentication communication device 182 communicates with the terminal device 40 and the authentication information is passed to the vehicle 100, the authentication camera 184 performs imaging. The authentication device 180 includes a first occupant configuration recognizer 181. The first occupant configuration recognizer 181 analyzes the authentication camera 184 and recognizes the occupant configuration. On the basis of the authentication information and the occupant configuration recognized by the first occupant configuration recognizer 181, the authentication device 180 determines whether or not to permit the occupant to use the vehicle 100.

Figure 10:
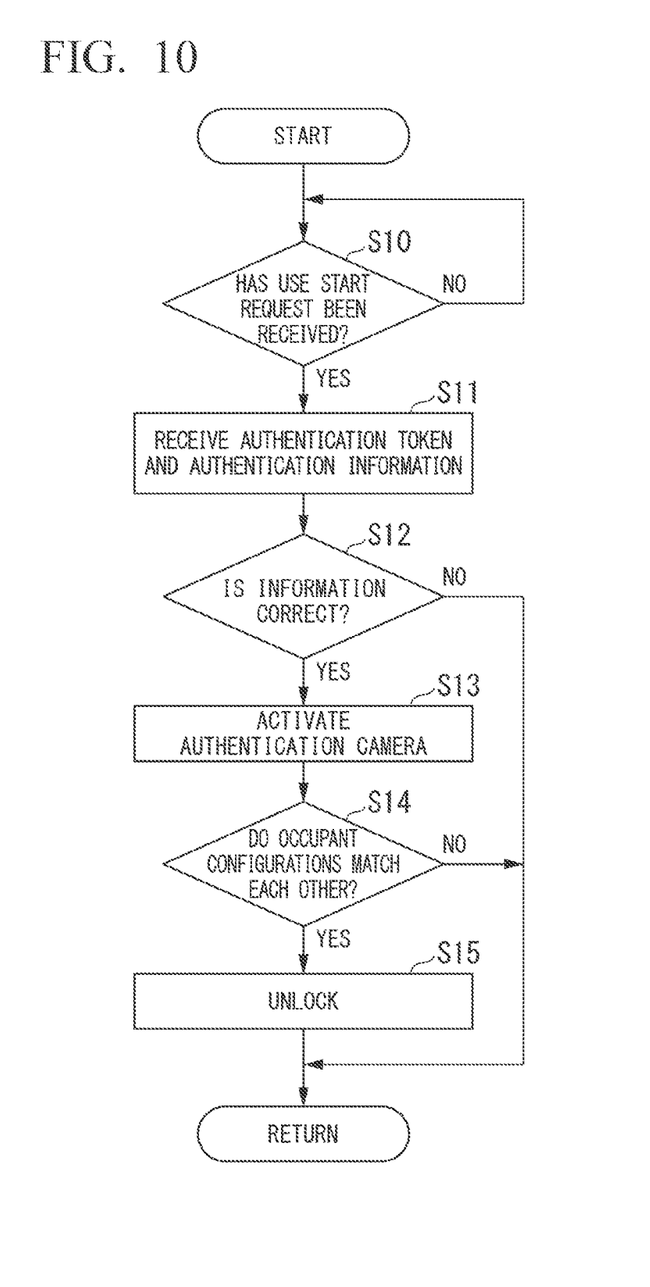
FIG. 10 is a flowchart illustrating an example of a flow of a process that is executed by an authentication device.

FIG. 10 is a flowchart illustrating an example of a flow of a process that is executed by the authentication device 180. First, the authentication device 180 waits until the authentication communication device 182 receives a use start request of the vehicle 100 (step S10). When the authentication communication device 182 receives a use start request of the vehicle 100, the authentication communication device 182 subsequently receives an authentication token and authentication information (step S11).

Then, the authentication device 180 determines whether the authentication token and the authentication information are correct (step S12). Specifically, the authentication device 180 determines whether or not the information is correct on the basis of, for example, whether or not the authentication token is paired with the authentication token received from the car sharing support server 50 in advance and whether or not information such as the identification information of the vehicle, the date, the time period, and the departure place included in the authentication information matches the identification information of the vehicle 100 paid out in advance, a current date or time period, the position of the vehicle 100, and the like.

When the authentication device 180 determines that the information is correct, the authentication device 180 activates the authentication camera 184 to cause the authentication camera 184 to perform imaging (step S13). The authentication device 180 determines whether or not the occupant configuration recognized by the first occupant configuration recognizer 181 and the occupant configuration included in the authentication information received in step S11 match each other (step S14). The occupant configuration may include the presence or absence of animals such as pets. When the occupant configurations match each other, the authentication device 180 instructs a door lock mechanism (not illustrated) of the vehicle 100 to perform unlocking (step S15). In this case, the authentication device 180 may instruct the communication device 120 to notify the terminal device 20 of the owner 10 that the vehicle 100 has been unlocked. An address of the terminal device 20 may be included in the authentication information or may be acquired together with the authentication token from the car sharing support server 50 when the rental is approved.

When a negative determination is obtained in either step S12 or S14, the authentication device 180 does not instruct unlocking of the vehicle 100, and ends the process of this flowchart.

[Control After Start of Travel]

Figure 11:
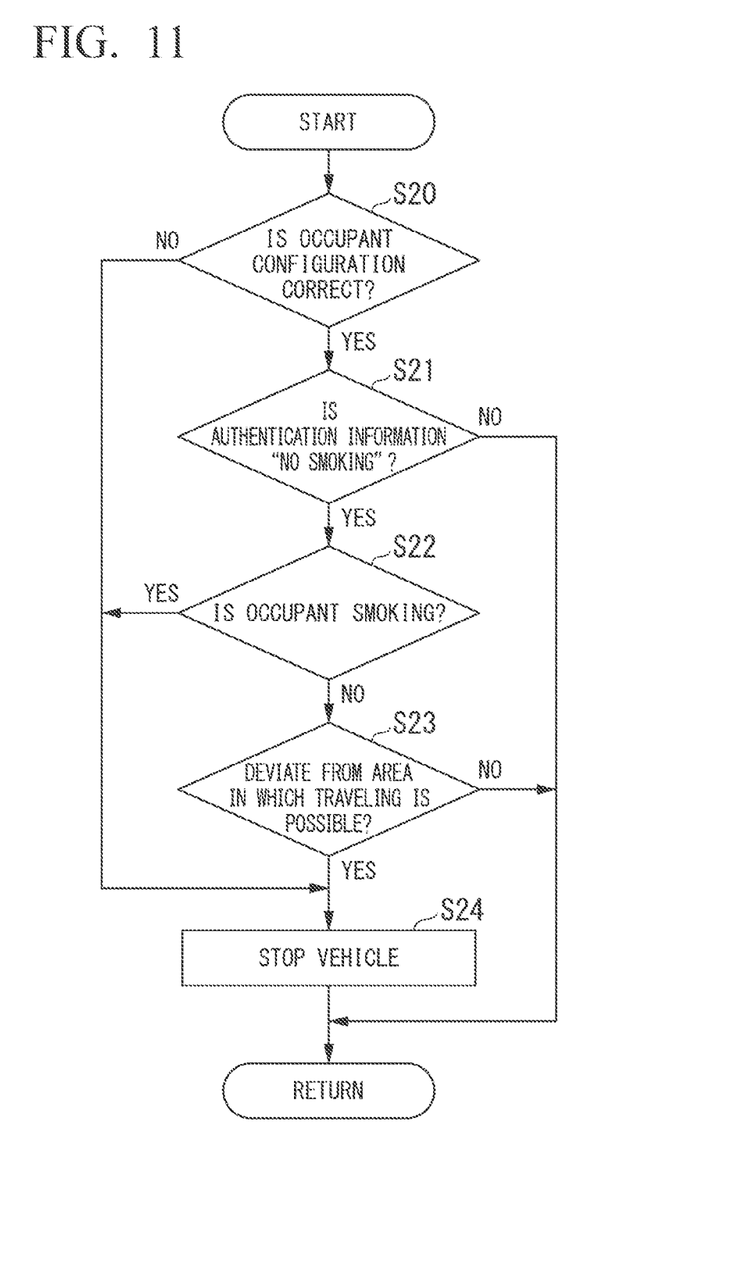
FIG. 11 is a flowchart illustrating an example of a flow of a process that is executed by a traveling condition monitoring unit.

Hereinafter, content of control of the traveling condition monitoring unit 242 will be described. The traveling condition monitoring unit 242 operates after the unlocking is performed by the authentication device 180 and the vehicle 100 is started up. Hereinafter, the control of the traveling condition monitoring unit 242 will be described with reference to a flowchart.

FIG. 11 is a flowchart illustrating an example of a flow of a process that is executed by the traveling condition monitoring unit 242. The process of this flowchart is repeatedly executed, for example, while a system power supply of the vehicle 100 is on.

First, the traveling condition monitoring unit 242 refers to the recognition result of the second occupant configuration recognizer 232 and determines whether or not the occupant configuration of the occupant getting in the vehicle 100 matches the occupant configuration included in the authentication information (whether or not the occupant configuration is correct) (step S20). The occupant configuration may include the presence or absence of a pet. When the traveling condition monitoring unit 242 determines that the occupant configuration is not correct, the traveling condition monitoring unit 242 decelerates the vehicle 100 and stops the vehicle 100 at a place at which the vehicle 100 does not interfere with other vehicles, such as a shoulder or a parking lot (step S24).

When the traveling condition monitoring unit 242 determines that the occupant configuration is correct, the traveling condition monitoring unit 242 determines whether or not "no smoking" information is included in the authentication information (step S21). When the authentication information includes "no smoking" information, the traveling condition monitoring unit 242 refers to a recognition result of the smoking recognizer 234 and determines whether any of the occupants are smoking (step S22). When any of the occupants are smoking, the traveling condition monitoring unit 242 decelerates the vehicle 100 and stops the vehicle 100 at a place at which the vehicle 100 does not interfere with other vehicles, such as a shoulder or a parking lot (step S24).

When the traveling condition monitoring unit 242 determines that the occupants are not smoking, the traveling condition monitoring unit 242 determines whether or not the position of the vehicle 100 has deviated from the area in which traveling is possible, which is included in the authentication information, on the basis of the position of the vehicle 100 specified by the navigation device 150, the second map information 162, and the authentication information (step S23). "Deviating from the area in which traveling is possible" means not only a case in which the position of the vehicle 100 is actually outside the area in which traveling is possible but also a case in which the vehicle 100 has deviated from the area in which traveling is possible within a predetermined time (or within a predetermined traveling distance) when the vehicle 100 continues to travel on a current road as it is. When the position of the vehicle 100 has deviated from the area in which traveling is possible, which is included in the authentication information, the traveling condition monitoring unit 242 decelerates the vehicle 100 and stops the vehicle 100 at a place that the vehicle 100 does not interfere with other vehicles, such as a shoulder or a parking lot (step S24).

When the user 30 inputs the arrival place registered as the rental condition as a destination to the navigation device 150 and the vehicle 100 is traveling in automated driving, the position of the vehicle 100 does not normally deviate from the area in which traveling is possible. A deviation may occur, for example, when the vehicle 100 is traveling in manual driving or when the user 30 inputs a destination different from the arrival place registered as the rental condition to the navigation device 150 and the vehicle 100 is traveling in automated driving.

With such a configuration and process, it is possible to prevent dirtying of the seats or deterioration or theft of the vehicle 100 due to use of the vehicle 100 in an aspect of use not intended by the owner 10. Accordingly, the owner 10 can lend the vehicle 100 to another person with peace of mind, and smooth lending and borrowing of the vehicle is realized.

According to the first embodiment described above, it is possible to realize smooth lending and borrowing of a vehicle.

In the first embodiment, the vehicle 100 to be rented may be a vehicle having no automated driving function. In this case, when the traveling conditions are monitored after start-up of the vehicle 100, for example, the authentication device 180 may cause the HMI to output an alarm, the vehicle 100 may be stopped by an operation of the occupant, the travel driving force output device 300 may be locked, and then, the vehicle 100 may be maintained in a stopped state.

Second Embodiment

Hereinafter, a second embodiment will be described. In the vehicle use system of the second embodiment, in a case in which the vehicle 100 is rented through mediation of the vehicle use system, manual driving is prohibited when constraints that the vehicle 100 can be used only in automated driving are applied. That is, the user 30 can use the vehicle 100 only in an automated driving state. Accordingly, the vehicle 100 is prevented from moving to a place not intended by the owner 10, and deterioration, theft, or the like of the vehicle 100 is prevented.

Figure 12:
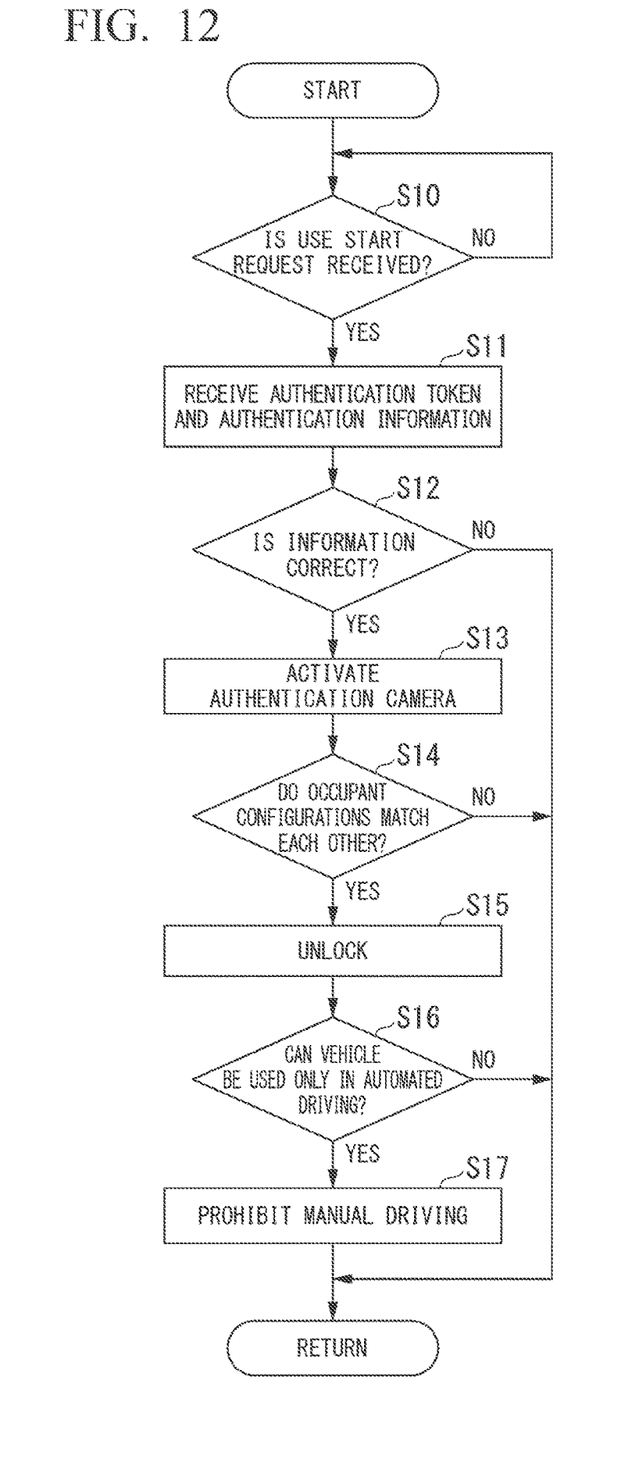
FIG. 12 is a flowchart illustrating an example of a flow of a process that is executed by an authentication device of a second embodiment.

FIG. 12 is a flowchart illustrating an example of a flow of a process that is executed by the authentication device 180 of the second embodiment. Since the processes of steps S10 to S15 is the same as the process illustrated in FIG. 10, description will thereof be omitted.

After the authentication device 180 instructs a door locking mechanism (not illustrated) of the vehicle 100 to perform unlocking, the authentication device 180 determines whether or not the constraint that the vehicle can be used only in automated driving is included by referring to the authentication information (Step S16). When the constraint that the vehicle can be used only in automated driving is included, the authentication device 180 notifies some or all of the automated driving control device 200, the travel driving force output device 300, the brake device 310, and the steering device 320, or an upper controller (not illustrated) that manual driving is prohibited (step S17).

According to the second embodiment described above, it is possible to protect the vehicle 100 more strongly, in addition to achievement of the same effects as those of the first embodiment.

In the second embodiment, when the rented vehicle 100 travels in automated driving, an arrival place that the user 30 has registered at the time of application for rental may be input as a destination to a navigation device 150 as it is. Thus, it is possible to protect the vehicle 100 more strongly.

<Others>

Although in each of the embodiments, the "authenticator" is realized by the authentication device 180 exclusively mounted in the vehicle 100, at least a part of the "authenticator" may be realized by a central server such as the car sharing support server 50. In this case, for example, an authentication token or the like read by the vehicle 100 is transmitted to the central server, collation is performed at the central server, and it is determined whether or not the authentication is successful.

<Hardware Configuration>

Figure 13:
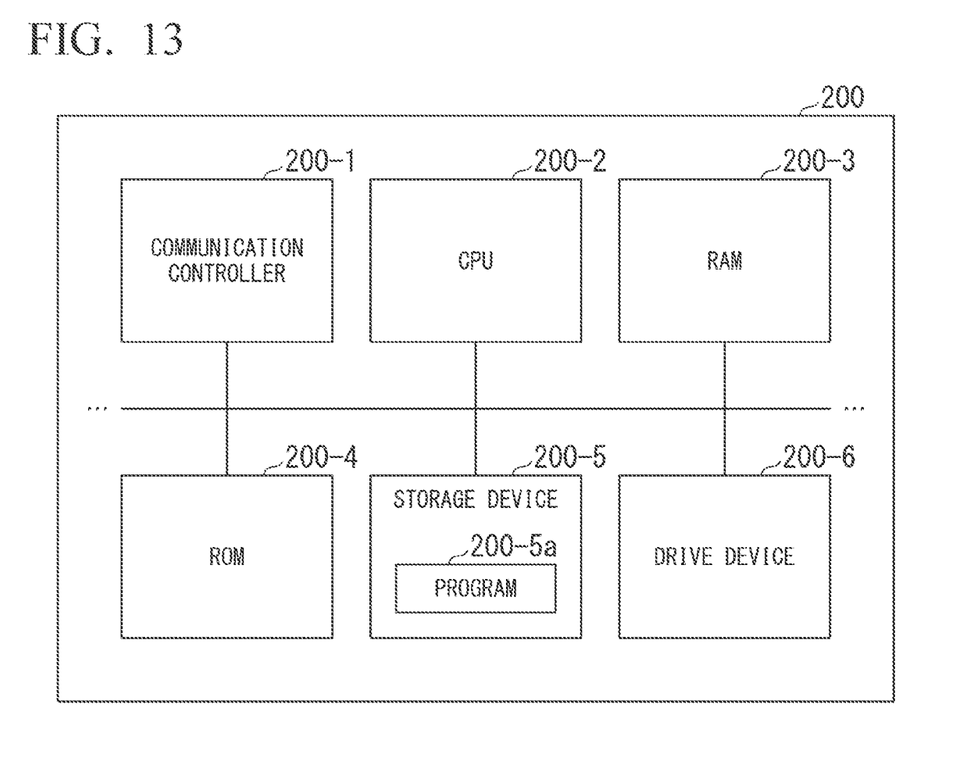
FIG. 13 is a diagram illustrating an example of a hardware configuration of an automated driving control device according to the embodiment.

FIG. 13 is a diagram illustrating an example of a hardware configuration of the automated driving control device 200 according to the embodiment. As illustrated in FIG. 13, the automated driving control device 200 has a configuration in which a communication controller 200-1, a CPU 200-2, a RAM 200-3 that is used as a work memory, a read only memory (ROM) 100-4 that stores a boot program or the like, a storage device 200-5 such as a flash memory or an HDD, a drive device 200-6, and the like are connected to each other by an internal bus or a dedicated communication line. The communication controller 200-1 communicates with components other than the automated driving control device 200. A program 200-5a to be executed by the CPU 200-2 is stored in the storage device 200-5. This program is developed in the RAM 200-3 by a direct memory access (DMA) controller (not illustrated) or the like and executed by the CPU 200-2. Accordingly, some or all of the first controller 220, the second controller 260, the first occupant configuration recognizer 181 and the like are realized.

Although a mode for carrying out the present invention has been described above using the embodiment, the present invention is not limited to the embodiment at all, and various modifications and substitutions may be made without departing from the spirit of the present invention.

What is claimed is:

1. A vehicle use system comprising:
    an authentication information assignor that assigns authentication information for using a vehicle to a user;
    an authenticator that acquires the authentication information to permit use of the vehicle, at least a part of the authenticator being mounted in the vehicle; and
    a driving controller that automatedly controls acceleration, deceleration, and steering of the vehicle,
    wherein the authentication information assignor assigns the authentication information in which constraints are applied to both a time period and an area in which traveling is possible to the user, and
    wherein the driving controller enables the user to use the vehicle as long as the constraints applied to the authentication information are satisfied, and when the position of the vehicle has deviated from the area of the constraints applied to the authentication information, the driving controller decelerates the vehicle and stops the vehicle at a place that the vehicle does not interfere with other vehicles by the automated controlling.

2. The vehicle use system according to claim 1, wherein the authentication information is information that is assigned each time the user uses the vehicle once.

3. The vehicle use system according to claim 1, wherein the authentication information assignor assigns authentication information in which the constraint that the vehicle is available only in automated driving is applied, to the user, and
    the driving controller performs only the automated driving of the vehicle and prohibits manual driving of the vehicle by the user when the authentication information in which the constraint that only automated driving is available is applied is acquired by the authenticator, and performs the automated driving of the vehicle and allows the manual driving of the vehicle by the user when the authentication information in which the constraint is not applied is acquired by the authenticator.

4. The vehicle use system according to claim 1, wherein the authentication information assignor assigns authentication information to which constraints on an occupant configuration are further applied, to the user,
    the vehicle use system further comprises a first occupant configuration recognizer that is mounted in the vehicle and recognizes an occupant configuration of occupants before the occupants get in the vehicle, and
    the authenticator does not permit use of the vehicle when the occupant configuration recognized by the first occupant configuration recognizer is not suitable for the constraints applied to the authentication information acquired by the authenticator.

5. The vehicle use system according to claim 1, wherein the authentication information assignor assigns the authentication information to which constraints on an occupant configuration are further applied, to the user,
    the vehicle use system further comprises a second occupant configuration recognizer that is mounted in the vehicle and recognizes an occupant configuration of an occupant after the occupant gets in the vehicle, and
    the authenticator does not permit use of the vehicle when the occupant configuration recognized by the second occupant configuration recognizer is not suitable for the constraints applied to the authentication information acquired by the authenticator.

6. The vehicle use system according to claim 4, wherein the constraints on the occupant configuration include constraints on animals.

7. The vehicle use system according to claim 1, wherein the authentication information assignor assigns authentication information in which constraints on smoking are further applied, to the user, the vehicle use system further comprises a smoking recognizer that is mounted in the vehicle and recognizes smoking of an occupant including the user, and the driving controller stops use of the vehicle of the user when constraints on smoking have been applied to the authentication information acquired by the authenticator and smoking of the occupant is recognized by the smoking recognizer.

8. A vehicle use system comprising:

an authentication information assignor that assigns authentication information for using a vehicle to a user;

an authenticator that acquires the authentication information to permit use of the vehicle, at least a part of the authenticator being mounted in the vehicle; and a driving controller that automatedly controls acceleration, deceleration, and steering of the vehicle, wherein the authentication information assignor assigns the authentication information in which a constraint that only automated driving is available is applied, to the user, and the driving controller performs only the automated driving of the vehicle and prohibits manual driving of the vehicle by the user when the authentication information in which the constraint that only automated driving is available is applied is acquired by the authenticator, and performs the automated driving of the vehicle and allows the manual driving of the vehicle by the user when the authentication information in which the constraint is not applied is acquired by the authenticator.

9. A vehicle use system comprising:

an authentication information assignor that assigns authentication information for using a vehicle to a user;

an authenticator that acquires the authentication information to permit use of the vehicle, at least a part of the authenticator being mounted in the vehicle;

an occupant configuration recognizer that is mounted in the vehicle and recognizes an occupant configuration of an occupant including the user before the user gets in the vehicle; and a driving controller that automatedly controls acceleration, deceleration, and steering of the vehicle, wherein the authentication information assignor assigns the authentication information in which constraints on an occupant configuration are applied, to the user, the authenticator does not permit use of the vehicle when the occupant configuration recognized by the occupant configuration recognizer is not suitable for the constraints applied to the authentication information acquired by the authenticator, and the driving controller decelerates the vehicle and stops the vehicle at a place that the vehicle does not interfere with other vehicles by the automated controlling when the occupant configuration recognized by the occupant configuration recognizer is not suitable for the constraints.

* * * * *